July 27, 1926.
W. W. STRYKER
1,594,078
CORK SEATED FUEL VALVE
Filed April 18, 1922
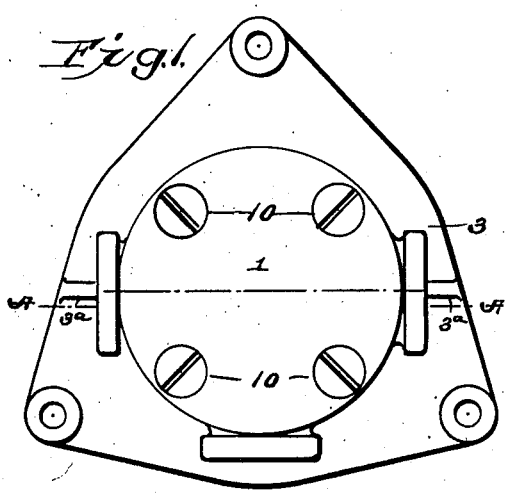
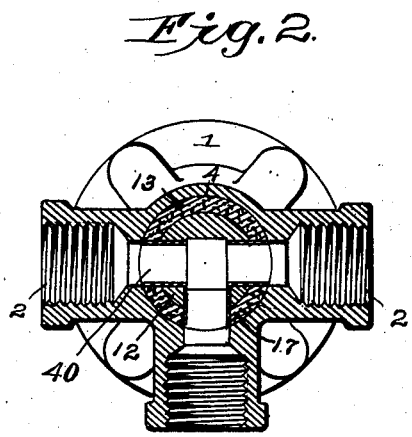
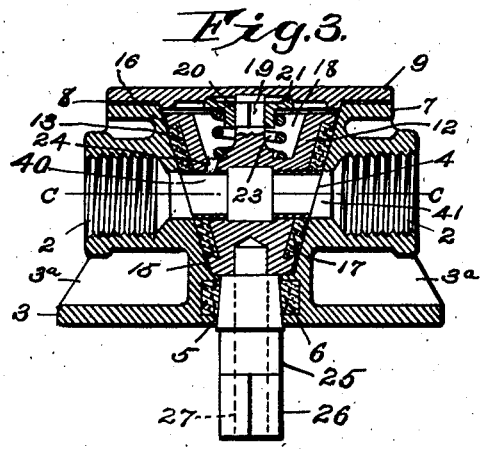
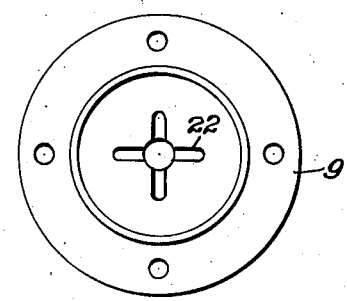
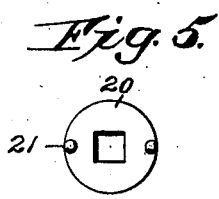
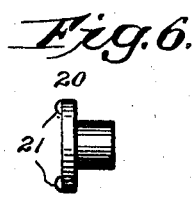
Inventor
E. J. Jones
Administrator for the estate of
W. W. Stryker, deceased.
By Robert H. Young    Attorney Patented July 27, 1926.

1,594,078

UNITED STATES PATENT OFFICE.

WALTER W. STRYKER, DECEASED, LATE OF DAYTON, OHIO; BY EDWARD T. JONES, ADMINISTRATOR, OF DAYTON, OHIO.

CORK-SEATED FUEL VALVE.

Application filed April 18, 1922. Serial No. 555,350.

This invention relates in general to valve assemblies for use in fluid passage lines and more particularly to a cork seated leakproof valve for use in fuel lines, particularly of aircraft and other vehicles, the features of which will be hereinafter disclosed.

The benefits to be derived from such a valve to be adapted for use in an airplane cannot be over-estimated in view of the tremendous hazard from fire when valves used in the fuel lines are not leakproof.

It is an object of this invention to provide a seat for a valve comprising non-corrodible yieldable material, such that the prevention of corrosion and leakage is assured.

It is a further object of this invention to so mount this yieldable material as to permit it to form a seal under light pressure while providing against damage to the same in the case of excess pressure; and to secure it in position in several ways, as will be hereinafter described, to prevent any excess wear or damage thereto.

It is a prime object of this invention to provide a tapered valve in which the pressure of the fluid flowing through the fluid lines in which this valve is to be used will tend to more securely seat the valve.

It is a further object of this invention to provide a suitable control means for this valve so that it may be turned at will and held automatically in the various positions desired. These and other objects of the invention will be disclosed in the accompanying specification and drawings, in which Figure 1 is a top plan view of this invention, showing the valve casing and closure member;

Figure 2 is a section on the line C—C of Figure 3;

Figure 3 is a section on the line A—A of Figure 1;

Figure 4 is a bottom plan view of the closure member;

Figure 5 is a top plan view of the registering collar; and

Figure 6 is a side elevation of the device shown in Figure 5.

Referring in detail to the drawings, 1 is a valve casing provided in any suitable manner with a plurality of suitably designed fluid inlets 2. In this particular showing this device is drawn to show a three-way valve though it will be obvious as this description progresses that the invention may be applied to a two-way valve, or a valve comprising any plurality of ways, without departing from the spirit of the invention described herein. Casing 1 is provided with a flange portion 3 for mounting the valve assembly at any desired position, as for instance the dashboard of a vehicle or airplane, or any support member thereof. Webs 3ª are added for bracing between the main valve assembly and this flange portion 3. A tapered valve seat 4 is provided in casing 1 for the reception of the valve which will be hereinafter discussed. At the small end of the tapered valve seat casing 1 is an incut recess 5 provided for the reception of a leakproof stuffing gland 6 preferably made of cork or some such non-corrodible leakproof material. The valve casing is provided adjacent the larger end of the tapered valve seat with a flanged portion 7 adapted to receive the closure member 9 which is secured to the casing by screw members 10. A suitable gasket 8 is provided to prevent leakage between the closure member and the valve casing.

A tapered valve 12 of suitable metal is provided to seat in the valve seat casing 1. This valve is of unique structure, having throughout almost the entire length of the valve proper a distinct incut portion or groove 13 extending completely around its periphery and leaving only small portions 15 and 16 of the original tapered surface at the inner and outer portions thereof. It will be noted that the groove is incut adjacent 15 and 16 to provide a dovetailed joint for a cork liner 17 which is forced onto the valve under high pressure and forms a permanent and inseparable member thereof. This cork liner conforms to the taper of the valve seat and is ground until it is of very slightly greater relative diameter than the normal taper of the valve. Thus, when the valve is seated under all normal pressures there will be no seating of metal against metal, but merely of the cork liner against the valve seat of the casing. In case of excess pressures, however, the cork will become compressed until the metal portions 15 and 16 take up the excess pressure and prevent any damage to the cork liner. Protection tubes 40 are inserted in the fluid passages 41, formed in the valve plug, for the purpose of preventing any distortion or destruction of the cork liner adjacent the valve fluid passages.

The metal portion of the valve is further fashioned to provide a recess 18 around the inner end of the valve stem 19 which valve stem is shown to be an integral part of the metal portion of the valve. The inner end of the valve stem is squared to fit the bore of collar 20 (see Fig. 5). Collar 20 is provided with rounded protuberances 21 for registering with slots 22 in the closure 9 when the valve is turned to indicate operative positions. A spring 23 mounted between the closure member and the larger end of the tapered valve tends to hold the valve normally in its seat.

It has been noted in tapered valves of this character heretofore designed that the pressure of the fluid in the fluid lines for use in which it has been designed tends to unseat the valve. To obviate this difficulty, a secondary passage 24 of small bore leading from the tube 40 to the recess 18 has been provided which recess is, as has been shown, fluid tight. The pressure of the fluid in recess 18 will be exerted equally in all directions and since the closure member is of course fixed in position the effect of the fluid pressure on the valve will be to force it more firmly against its seat.

The outer end 25 of the valve stem is squared as at 26 to receive any suitable key or control member. The valve stem 25 has a tapered exterior so that in assembly it tends to compress the stuffing gland 6 tightly to prevent leakage.

From the foregoing it will be seen that the valve as designed will provide a non-corrodible leakproof valve seating. It will be noted that the cork liner is protected against all undue stresses, and it will be further noted that any pressure of the fluid flowing through the fluid lines and the valve fluid passages will tend to more securely force the valve into its seat.

What is claimed is:

1. In combination in a valve assembly, a valve casing provided with a valve seat, a valve plug adapted to be seated in said valve seat, a valve stem on each end of said valve plug, one of said valve stems being adapted to receive a control member and the inner end extending into a recess in the valve plug, a closure member for said valve casing provided on its inner surface with a series of grooves, a collar mounted on said valve stem slidable longitudinally thereon but permitting no relative rotational movement, and provided with means for registering with the grooves in said closure member, and resilient means between said collar and said valve plug for holding said collar in engagement with said closure member.

2. In combination in a valve assembly, a valve casing provided with a tapered valve seat, a tapered valve plug adapted to be seated in said valve seat, said valve being fashioned to provide an annular groove around said plug, a liner of yieldable packing material dovetailed in said groove and having a relative diameter slightly greater than the normal diameter of the valve plug at any corresponding point throughout its length, fluid passages in said valve casing and said valve plug adapted to register with each other when desired, and a series of protecting tubes mounted in the passages in said valve plug and extending slightly beyond said valve plug into corresponding passages in the valve liner for the dual purpose of preventing relative rotational movement between the liner and the valve plug and of preventing distortion of the valve plug liner passages, a closure member for said valve casing, and means for holding said valve plug against said valve seat.

3. In combination in a valve assembly, a valve casing provided with a tapered valve seat and with fluid passages, a tapered valve plug adapted to be seated in said valve seat, said valve being fashioned to provide an annular groove around said plug, a liner of yieldable packing material fixedly mounted in said groove and having a relative diameter slightly greater than the normal diameter of the valve plug at any corresponding point throughout its length, fluid passages extending through said valve plug and said liner of packing material, a closure member for said valve casing, resilient means for holding said valve plug against said valve seat, and means utilizing the pressure of the liquid in the fluid line for holding said valve plug in said valve seat.

4. In combination in a valve assembly, a valve casing provided with a valve seat, a valve plug adapted to be seated in said valve seat, a valve stem on each end of said valve plug, one of said valve stems being adapted to receive a control member and the other stem extending into a recess in the valve plug, a closure member for said valve casing provided on its inner surface with a series of grooves, a collar mounted on said valve stem slidable longitudinally thereon but permitting no relative rotational movement, and provided with means for registering with the grooves in said closure member, and resilient means between said collar and said valve plug for holding said collar in engagement with said closure member, said valve casing being provided with an annular recess adjacent its outer end, an annular gasket of yieldable packing material seated in said recess, the outer valve stem being tapered and bearing against said annular gasket.

5. In combination in a valve assembly, a valve casing provided with a tapered valve seat and with fluid passages, a tapered valve plug adapted to be seated in said valve seat, said valve being fashioned to provide an annular groove around said plug, a liner of yieldable packing material fixedly mounted in said groove and having a relative diameter slightly greater than the normal diameter of the valve plug at any corresponding point throughout its length, fluid passages extending through said valve plug and said liner of packing material, protection tubes extending through said fluid passages and liner, a closure member for said valve casing, resilient means for holding said valve plug against said valve seat, and means utilizing the pressure of the liquid in the fluid line for holding said valve plug in said valve seat.

In testimony whereof I affix my signature.

EDWARD T. JONES,
*Administrator of the Estate of Walter W. Stryker, Deceased.*